(12) United States Patent
Min et al.

(10) Patent No.: US 6,628,471 B1
(45) Date of Patent: Sep. 30, 2003

(54) DETECTION AND CANCELLATION OF CAGE FREQUENCY USING THE CLOCK HEAD IN A SERVOWRITER

(75) Inventors: ShuangQuan Min, Singapore (SG); Ricky WeiWatt Yeo, Singapore (SG); KianKeong Ooi, Singapore (SG); Xiong Liu, Singapore (SG); BengWee Quak, Singapore (SG); ChiapHeok Ang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 285 days.

(21) Appl. No.: 09/798,801

(22) Filed: Mar. 2, 2001

Related U.S. Application Data

(60) Provisional application No. 60/212,217, filed on Jun. 16, 2000.

(51) Int. Cl.[7] .......................... G11B 21/02; G11B 27/36; G11B 19/04; G11B 5/09; G11B 5/596
(52) U.S. Cl. ............................. 360/75; 360/31; 360/60; 360/51; 360/77.02
(58) Field of Search ........................ 360/31, 75, 77.04, 360/60, 77.02, 77.07, 77.08, 51

(56) References Cited

U.S. PATENT DOCUMENTS

| | | | | |
|---|---|---|---|---|
| 5,519,546 | A | 5/1996 | Lewis | 360/48 |
| 5,856,624 | A | 1/1999 | Elsing | 73/865.9 |
| 6,078,458 | A | * 6/2000 | Fioravanti et al. | 360/73.03 |
| 6,134,976 | A | 10/2000 | Elsing | 73/865.9 |
| 6,404,580 | B1 | * 6/2002 | Fioravanti | 360/75 |
| 6,476,995 | B1 | * 11/2002 | Liu et al. | 360/75 |

* cited by examiner

*Primary Examiner*—Andrew L. Sniezek
(74) *Attorney, Agent, or Firm*—Westman, Champlin & Kelly, P.A.

(57) ABSTRACT

The magnitude and frequency of runout due to vibration of the cage of the spindle motor is detected. A plurality of servo patterns are written to a reference track having a clock pattern on the disc, and the plurality of servo patterns are then read over a plurality of revolutions of the disc using a clock head. The magnitude of position error of the clock head relative to the reference track is identified for each of the read servo patterns. The magnitude and frequency of runout due to cage vibration is identified from the position errors. Servo patterns are written to user tracks on the disc by identifying periods of low magnitude runout due to cage vibration, and writing the servo patterns to the user track during those periods of low magnitude runout.

20 Claims, 5 Drawing Sheets

DETECTION AND CANCELLATION OF CAGE FREQUENCY USING THE CLOCK HEAD IN A SERVOWRITER

CROSS-REFERENCE TO RELATED APPLICATION

This application claims benefit of U.S. Provisional Application No. 60/212,217 filed Jun. 16, 2000 for "Detection and Cancellation of Cage Frequency using the Clock Head in a Servowriter".

FIELD OF THE INVENTION

This invention relates to detection and cancellation of non-repeatable run-out due to spindle motor cage vibration during a servowrite operation in a disc drive.

BACKGROUND OF THE INVENTION

Spindle motor vibration, known as non-repeatable runout (NRRO), causes motion between the head and media during the rotation of the media by the spindle motor. Spindle NRRO is composed of low-frequency vibration generated by the ball bearings of the motor, the largest single component being the cage vibration generated by the motor cage. Cage vibration is an extremely low frequency vibration that causes DC track spacing errors during servo writing.

Servowrite operations are performed during manufacture of the disc drive to record servo data onto one or more disc surfaces of the disc drive. The servo writer is affixed to the disc drive and includes a read/write clock head positioned by an actuator arm over the disc to write clock patterns to the disc and to control the data head of the disc drive to write servo data patterns to the disc. In disc drives employing embedded servo patterns, the servo data patterns are written into servo sectors between user fields on each track.

Servo patterns are written on the disc by first writing a clock pattern onto the entire track, or group of tracks, on the disc, including those portions that will become user fields. The clock pattern is usually written over more than one convolution of the disc, over-writing the clock pattern recorded during the prior convolution, to assure that the clock pattern is recorded over the entire track. The end point, where the two recorded convolutions meet, is called the splice point. Next, the track is separated into servo sectors and user data fields, and the disc drive data head writes the servo pattern over the recorded clock patterns in the servo sectors while the clock head reads the clock pattern.

Radial motion of the disc beneath the data head due to spindle motor cage vibration causes the servo writer to write the servo pattern in a spiral, rather than a circle, resulting in a radial discontinuity of the servo pattern at the splice point. As a result, the servo sectors are recorded as segments of that spiral, and not truly on the circular path of the track.

Many servowriters include a laser positioning interferometer to measure relative movement between the disc drive data head and the clock head of the servo writer. However, the laser interferometer can not measure movement between the data head and the disc, which includes low-frequency motion due to cage frequency.

A high magnitude of spindle motor cage vibration in servowriter operations may cause a serious track closure or track squeeze errors, known as track misregistrations. The track closure error is evidenced by a phase error signal splice during servo pattern write operations that cause servo off-track failures during drive operations. The track squeeze is evidenced by adjacent tracks positioned closer than expected at various locations on the media. This track misregistration is a type of write-to-write track misregistration that generates data cross-talk between adjacent tracks and/or distorts the servo pattern causing defect servo pattern errors.

Experiments on motor cage vibration show that cage vibration is non-synchronous to spindle rotation, but is periodic. The periodic waveform of cage vibration repeats itself over intervals longer than one spindle rotation. Hence, a phase relationship exists between the waveform and spindle rotation. Moreover, the frequency of cage vibration is the same for all motors of same type, regardless of the disc drive system in which they are employed. Hence, the error written in the tracks due to cage vibration has a similar magnitude whether there are track closure errors or not. However, track closure and track squeeze appear to occur randomly due to complicated phase relationships of the cage frequency, spindle rotation and starting phase of the servo write.

The present invention provides a solution to this and other problems associated with cage vibration, and offers other advantages over the prior art.

SUMMARY OF THE INVENTION

The present invention is directed to a process of writing servo patterns to a storage disc of a disc drive. In one embodiment of the invention, the magnitude and frequency of runout due to vibration of the cage of the spindle motor is detected. A plurality of servo patterns are written to a reference track on the disc, and the plurality of servo patterns are then read over a plurality of revolutions of the disc using a read head, such as the read portion of a clock head. The magnitude of position error of the clock head relative to the reference track is identified for each of the read servo patterns. The magnitude and frequency of runout due to cage vibration is identified from the position errors.

In one form the invention, the servo patterns are written to user tracks on the disc by identifying periods of low magnitude runout due to cage vibration, and writing the servo patterns to the user track during those periods of low magnitude runout.

In some embodiments, the periods of low magnitude runout are identified by identifying the magnitude of a splice in the reference track and identifying periods when the magnitude of the splice is not greater than a threshold of acceptable position error.

In preferred embodiments, a track closure error is identified for the user track. If the track closure error exceeds a predetermined threshold, the writing of the servo pattern is repeated until the track closure error does not exceed the threshold.

In other preferred embodiments, track spacing between the user track and an adjacent track is identified. If the track spacing is less than a predetermined spacing threshold, writing of the servo pattern to the user track is repeated until the track spacing is not less than the spacing threshold.

Additional features and advantages will become apparent upon review of the following drawings and the accompanying detailed description.

DETAILED DESCRIPTION OF ILLUSTRATIVE EMBODIMENTS

Figure 1:
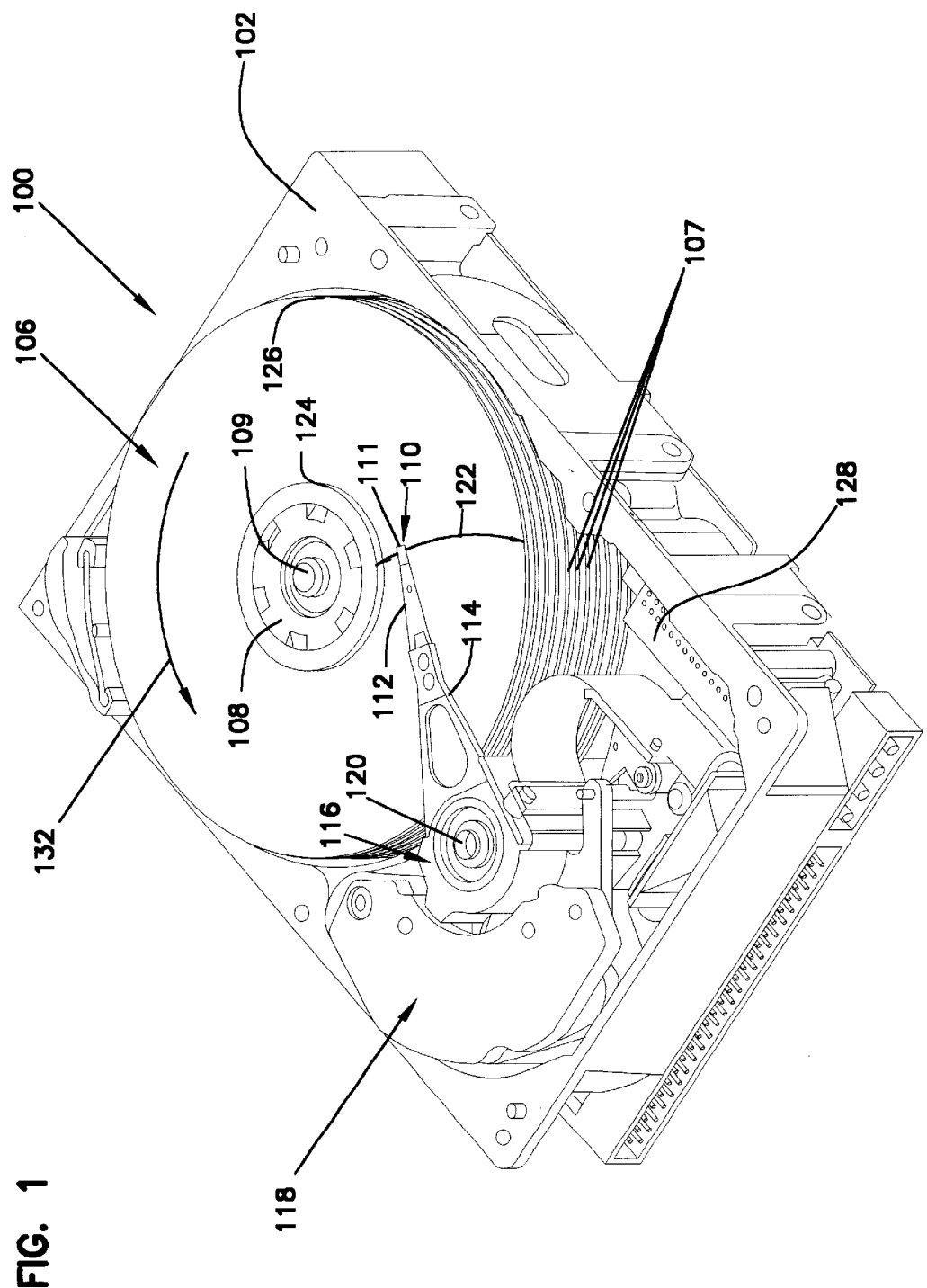
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown), by a disc clamp 108. Disc pack 106 includes a plurality of individual discs 107, which are mounted for co-rotation about central axis 109. Each disc surface has an associated disc head-slider 110 that is mounted to disc drive 100 for communication with the confronting disc surface. Head-slider 110 includes a slider structure arranged to fly above the associated disc surface of an individual disc of disc pack 106, and a transducing data head 111 arranged to write data to, and read data from, concentric tracks on the confronting disc surface. In the example shown in FIG. 1, head-sliders 110 are supported by suspensions 112 which are in turn attached to track actuator arms 114 of an actuator 116. Actuator 116 is driven by a voice coil motor (VCM) 118 to rotate actuator arms 114, and their attached data heads. 111, about a pivot shaft 120. Rotation of actuator arms 114 moves the heads along an arcuate path 122 to position the heads over a desired data track between a disc inner diameter 124 and a disc outer diameter 126. Voice coil motor 118 is operated by servo electronics included on circuit board 130 based on signals generated by the heads 111 of head-sliders 110 and a host computer (not shown). Read and write electronics are also included on circuit board 130 to supply signals to the host computer based on data read from disc pack 106 by the read heads of head-sliders 110, and to supply write signals to the write head of head-sliders 110 to write data to the discs.

Figure 2:
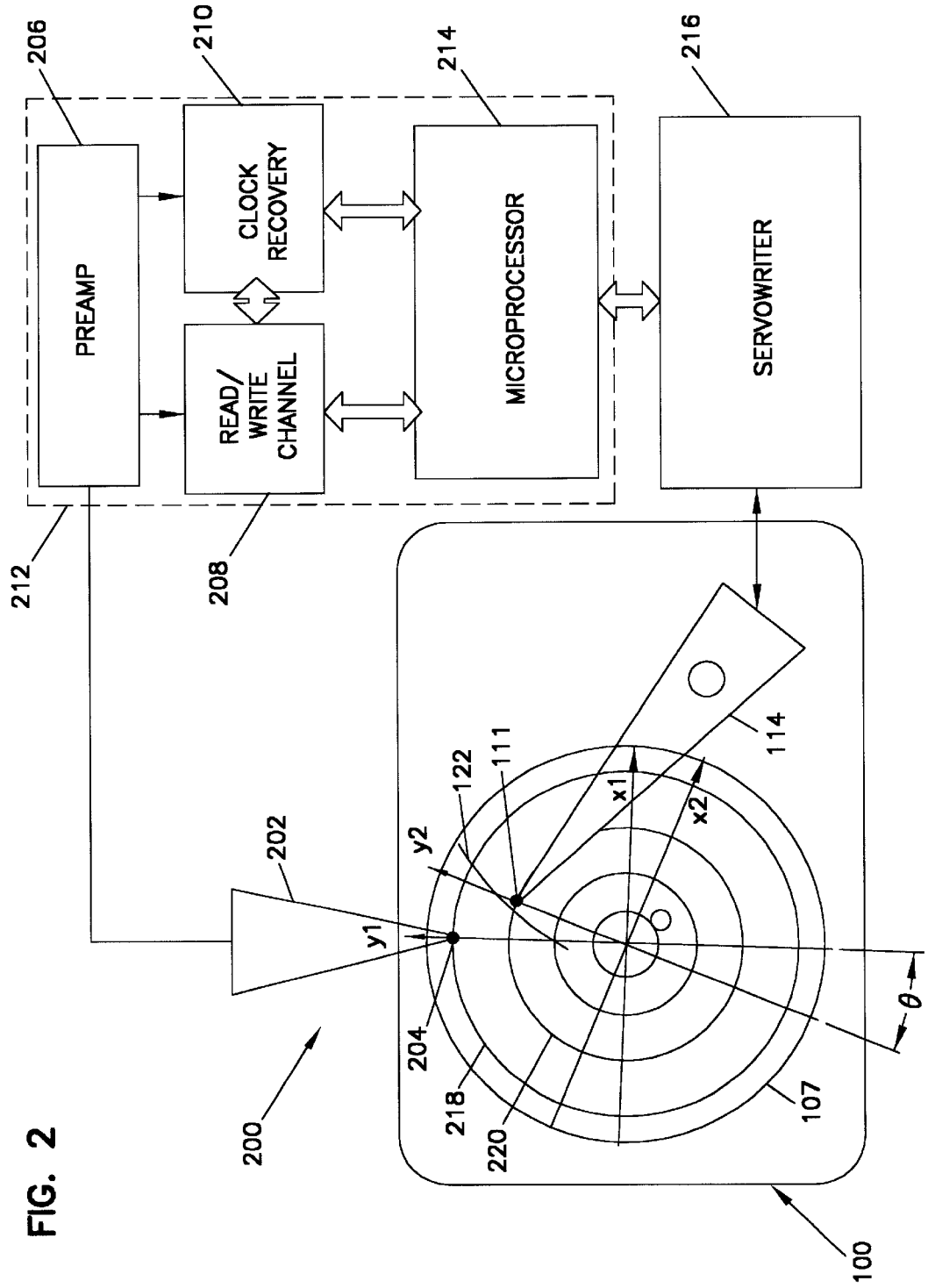
FIG. 2 is a diagram of a system of a servo writer coupled to the disc drive of FIG. 1 in accordance with the present invention.

FIG. 2 is a diagram illustrating a servo writer system 200, coupled to disc drive 100, used to write servo data into servo sectors on disc 107 of the disc drive. The servo writer includes an actuator arm 202 that positions clock head 204 over a reference or clock track 218 on disc 107. Track 218 is located at a specific location on the disc, such as the outermost track location, and is preferably a reserved clock track. Clock head 204 is coupled through preamplifier 206 to read-write channel 208 and clock recovery circuit 210 of track monitor 212. Track monitor 212 is coupled to microprocessor 214, which in turn is coupled to servo writer 216. Clock head 204 includes a read head and a write head.

Figure 3:
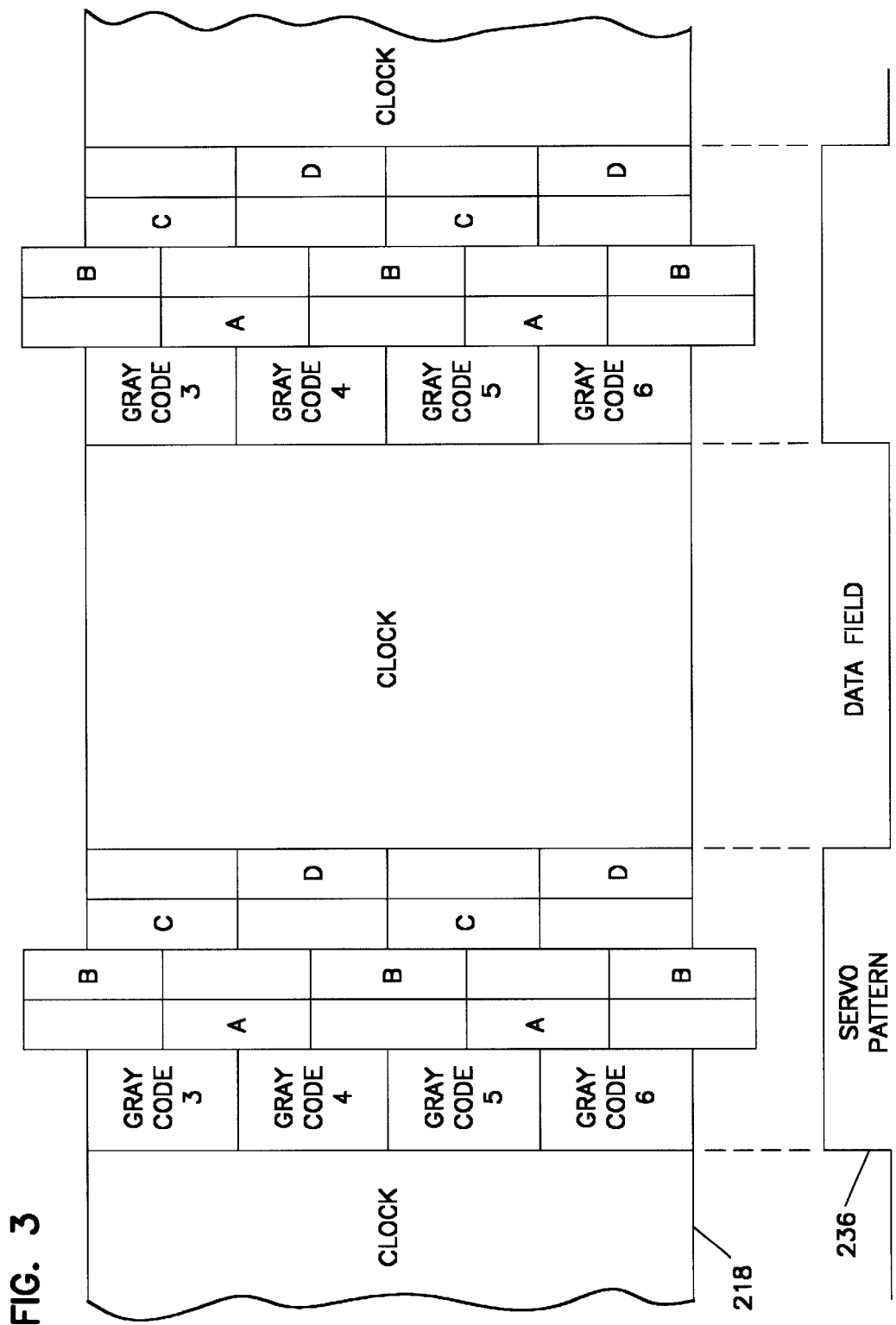
FIG. 3 illustrates the layout of a portion of a reference track on a disc of the disc drive of FIG. 1, and a corresponding servo gate signal, useful in explaining operation of the system illustrated in FIG. 2.

Initially, servo writer 216 operates clock head 204 to write a clock pattern to reference track 218. After the clock pattern is written to track 218, servo writer 216 operates actuator arm 114 to position data head 111 over track 218 and operates data head 111 to write a reference servo pattern to the servo sectors of reference track 218. The servo pattern written by data head 111 is illustrated in FIG. 3, and includes a gray code identifying the track, and A, B, C and D servo bursts, which are used to measure the position of a head relative to the track. The gray code and A, B, C and D servo burst patterns, as well as their use for track position error, are well known in the art. Other codes, such as address and track marks, automatic gain control codes, etc., may be included in the servo pattern, also well known in the art. The servo pattern written to track 218 is then read by clock head 204, and track monitor 212 calculates a position error of the clock head based on signals derived from the A, B, C and D burst patterns. Track monitor 212 also checks the track closure for track 218. If the track closure does not exceed a predetermined threshold, Thresh1, the process proceeds as described below to write servo signals to the remaining tracks. If track closure of track 218 exceeds Thresh1, the process is repeated until an acceptable track closure for track 218 is reached, based on the value of Thresh1. Hence, reference track 218 has a zero or acceptably low track closure error.

Next, servo writer 216 operates actuator arm 114 to fix the position of data head 111 relative to clock head 204 so that data head 111 confronts user track 220 while clock head 204 continues to confront reference track 218. Servo writer 216 operates data head 111 to write a servo pattern to track 220. Although track 220 is illustrated in FIG. 2 as removed from track 218, in fact it may be immediately adjacent track 218. At the same time that head 111 writes the servo pattern to track 220, clock head 204 reads the servo pattern and clock pattern from track 218. Clock head 204 sends the servo pattern to track monitor 212 where it is amplified and digitized and the position error of the clock head relative to track 218 is calculated from the magnitudes of the A, B, C and D bursts. Clock head 204 also sends the clock pattern to clock recovery circuit 210 of track monitor 212 to recover the clock signal. The process repeats for each user track on the disc or zone of the disc.

Figure 4:
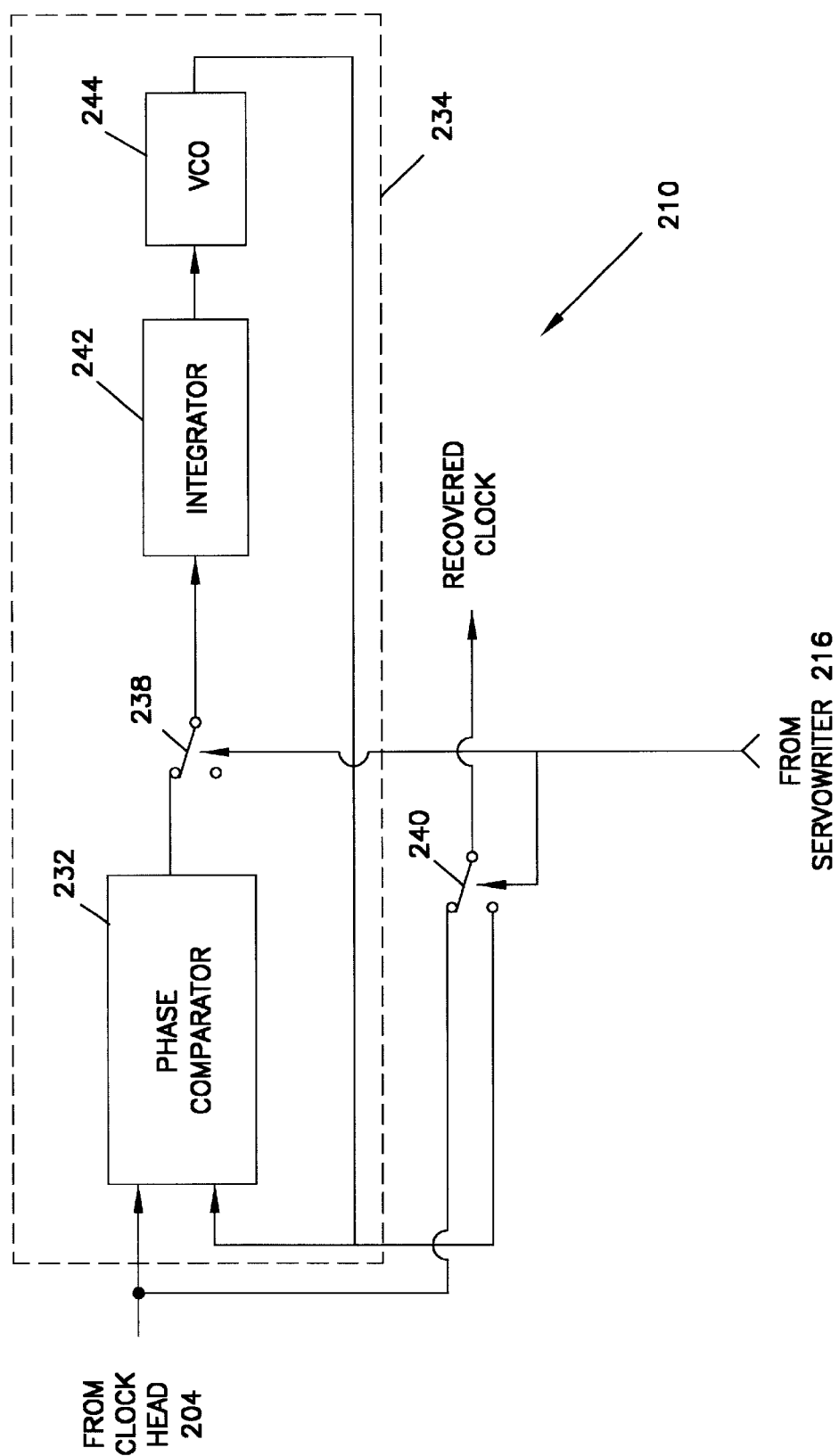
FIG. 4 is a diagram of a phase locked loop used in the servo writer of FIG. 2.

FIG. 4 is a block diagram of clock recovery circuit 210 for recovering the clock signal from the servo pattern and clock signal read by clock head 204. The recovered signals are applied to one input of phase comparator 232 of phase locked loop 234, and to a first input of switch 240. Servowriter 216 provides a servo gate signal 236, shown in FIG. 3, to switches 238 and 240. The high or low state of the servo gate signal separates the servo pattern from the clock pattern in the data field. Signal 236 sets switches 238 and 240 to the condition shown in FIG. 4 when signal 236 is low, and oppositely when signal 236 is high. When signal 236 is low, switch 240 passes the clock signals recovered by head 204 to microprocessor 214. Additionally, phase comparator 232 receives clock signals from head 204, which are passed through switch 238, integrated by integrator 242 to an analog signal and converted to a digital signal by voltage controlled oscillator 244 for input to the second input of phase comparator 232 and to a second input of switch 240. Hence, while clock head 204 reads clock signals from the data fields of track 218, phase locked loop 234 locks onto the clock frequency and provides the clock signal to the second input of switch 240. When clock head 204 reads servo patterns from the servo sectors of disc 107, servo gate signal 236 operates switch 238 to operate the phase locked loop in a "coasting" mode to supply previously locked clock signals to the second input of switch 240, and operates switch 240 to supply the locked clock signals to microprocessor 214 (FIG. 2).

Microprocessor 214 responds to the clock signals from clock recovery circuit 210 and to the servo pattern recovered through read/write channel 208 to calculate the runout read by clock head 204. The recovered pattern may include written repeatable runout, RRO, including spindle runout and track closure error caused by the cage frequency. The servo pattern on reference track 218 is read by clock head 204 over M revolutions of disc 107 to identify written runout for each servo sector n:

$$RRO(n) = \sum_{1}^{M} \frac{P(n, m)}{M},$$

where P(n, m) is the position error of servo sector n in revolution m, n∈ [0, $N_k$–1 ], m∈[0, M], M is the number of revolutions of disc 107 in the sample, and $N_k$ is the number of servo sectors on a track K.

The nonrepeatable runout P(n) due primarily to written-in cage frequency is $P(n)=P_c(n)-RRO(n),$ where $P_c(n)$ is the error signal read by clock head 204.

Microprocessor 214 learns the phase and magnitude of nonrepeatable runout due to cage frequency and establishes safe and unsafe windows for writing servo patterns. Written-in runout due to cage frequency has a substantially constant frequency and peak amplitude. Cage frequency is identified from the repeating pattern of the error signal magnitude over a low frequency extending beyond the number of servo sectors $N_k$ in a single revolution of the disc. The number of servo sectors, $N_c$, in a single cycle of the cage vibration frequency is calculated as $$N_c = \frac{N_k \cdot f_m}{f_c},$$

where $f_m$ is the spindle motor frequency and $f_c$ is the cage frequency. Hence, for a disc drive having 144 servo sectors per revolution ($N_k$), a spindle motor frequency $f_m$ of 90 Hz, and a cage frequency $f_c$ of 36 Hz, the number of servo sectors per cycle of cage vibration frequency, $N_c$, is 360.

Track monitor 212 learns the cage frequency from the magnitude of the cage vibration signal at various servo bursts in a revolution of cage frequency. More particularly, the track monitor employs the relationship $P_c(n_c,k)=\alpha \cdot P(n_c,k)+(1-\alpha) \cdot P_c(n_c,k-1),$ where $P_{c(nc)}$, k) is the magnitude of the cage vibration signal read from servo sector $n_c$, in revolution k of the cage cycle, where $n_c \in [0, N_c]$, and is a learning coefficient. The values of $P_c(n_c)$ are stored in a table in a random access memory in microprocessor 214 and are updated for each revolution k of the cage frequency cycle. Thus, with $N_c$=360, there are at least 360 entries in the random access memory.

The magnitude of the position error splice, Dj, at servo sector $n_c$ (between sectors $n_c$ and $n_c$+1) is the difference between the position error at servo sector $n_c$ and the position error at servo sector $n_c$+1. Consequently, the magnitude of the position error splice $Dj(n_c)$ can be predicted as $Dj(n_c)=P_c(n_c)-P_c(n_{c+}N_k),$ where $P_c(n_c)=P_c \cdot \sin(2\pi f_c T_s \cdot n_c),$ and $$T_s = \frac{1}{N_k f_m}$$

is the sampling duration of the servo sector. If the servo writer starts writing the servo track at servo sector $n_c$ of cage frequency, the position error splice $Dj(n_c)$ is predicted as $$Dj(n_c) = \frac{\sin(2\pi f_c T_s \cdot N_k)}{\sin\left(\pi f_c T_s \cdot \left(\frac{1}{2}N_c - N_k\right)\right)} \cdot P_c \cdot \sin\left(2\pi f_c T_s \cdot \left(n_c - \frac{1}{2}\left(\frac{1}{2}N_c - N_k\right)\right)\right).$$

Figure 5:
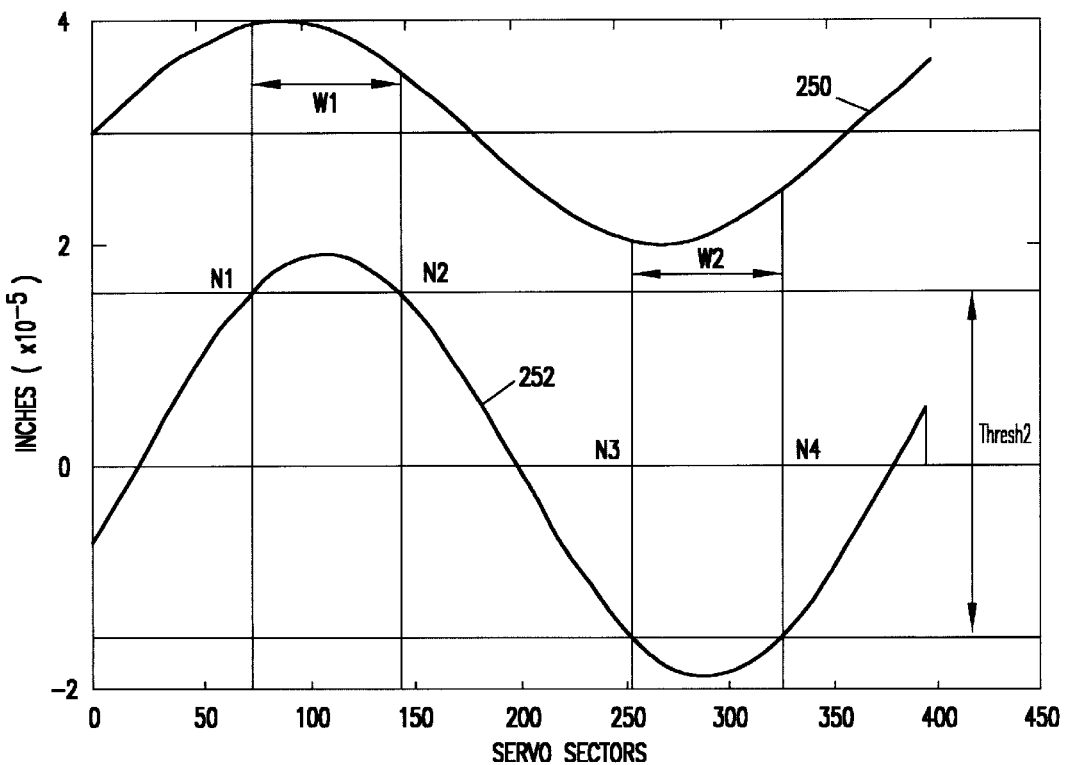
FIGS. 5 and 6 are diagrams of signals useful in explaining operation of the system of FIG. 2.

FIG. 5 illustrates the learned cage frequency profile 250 and the predicted position error splice $Dj(n_c)$ at waveform 252. A threshold signal, Thresh2, represents the threshold of the position error signal that will cause an off-track error in the disc drive. Track monitor 212 monitors the predicted position error splice, $Dj(n_c)$, at each servo burst ($n_c$). If the absolute value of the position error signal is smaller than the threshold signal, $|Dj(n_c)|$<Thresh2, track monitor 212 sets a safe gate signal to enable servo writer 216 to write servo patterns to disc 107 by data head 111. However, if $|Dj(n_c)| \geq$Thresh2, track monitor 212 sets a not-safe gate signal to inhibit servo writer 216 from writing servo patterns to disc 107 by data head 111. Thus, during periods W1 and W2 when the position error splice exceeds the threshold, track monitor 212 sets a not-safe gate signal to inhibit servo write from writing servo patterns, or to re-write the servo pattern.

Track monitor 212 also verifies the track closure and track squeeze during the servo write operation. At least two other trigger signals transfer between track monitor 212 and servo writer 216. One signal called a "servo trigger", is used by servo writer 216 to notify track monitor 212 that a servo write operation has started. The other signal, called "reference trigger", permits clock head 204 to notify servo writer 216 through track monitor 212 that the clock head detects an error. Servo writer 216 monitors the reference trigger signal from track monitor 212 and track monitor 212 monitors the servo trigger signal from servo writer 216. Before servo writer 216 commences writing a servo pattern on a user track via data head 111, servo writer 216 activates the servo trigger signal to track monitor 212. When track monitor 212 detects the servo trigger signal, it commences detection of track closure and track squeeze errors. In the event of an error, track monitor 212 provides the reference trigger signal to servo writer 216 causing the servo writer to rewrite the servo pattern. Otherwise, servo writer 216 advances head 111 to write the servo patterns of the next track.

Figure 6:
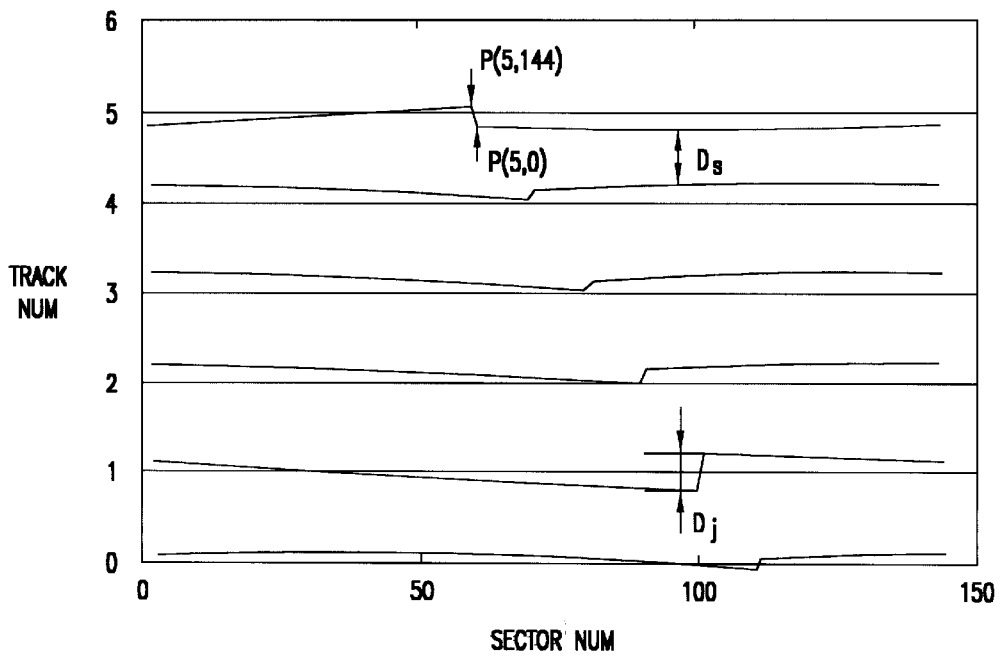

FIG. 6 illustrates the detection and reduction of track closure error at the splice (Dj) and track squeeze error (Ds). Detection and reduction of track closure error commences with the track monitor 212 detecting the servo trigger signal indicating the servo writer 216 has commenced writing servo patterns to track K. The position error signal, P(K, 0), of the sector of reference track 218 is saved by track monitor 212 in its random access memory.

Track monitor 212 counts the number of servo sectors written and checks to determine whether the last sector of track K has been written. For $N_k$ servo sectors on a track, the last written burst of the track is P(K, $N_{k-1}$). When track monitor 212 finds that the last servo burst of the track has passed, it checks to determine whether the position error signal splice between the first written burst and the last written burst of the track, i.e. Dj(K)=|P(K, 0)–P(K, $N_{k-1}$)|, exceeds a track closure threshold, Thresh3, for the user track. Thus, as shown at track 5 in FIG. 6, the position error splice between servo sectors 144 and 0 is measured, Dj(5)= |P(5, 0)-P(5, 144)|, against threshold Thresh3. If the position error signal splice exceeds this threshold, that is if Dj(5) ≧Thresh3, there is a track closure error on the written user track, track monitor 212 activates the reference trigger signal to inform the servo writer 216 of the track closure error, thereby causing the servo writer to rewrite the servo pattern for the track. The process repeats until the position error signal splice is within the threshold limit.

Detection and reduction of track squeeze (inadequate track spacing) is performed by the track monitor 212 saving the position error signal of the reference track during the servo write of the previous track K–1, denoted by P(K–1, n), for each n servo sector number of the track between 0 and N–1. When the servo writer 216 writes the servo pattern using head 111 for servo sector n of current user track K, track monitor 2)2 calculates the difference of the position error signal of the reference track written during the previous writing period to user track K–1 and that written during the current writing period to user track K. This position error difference is denoted by Ds(n)=P(K–1, n)–P(K, n). A track squeeze error occurs between track K–1 and track K if Ds(n) is smaller than a track squeeze threshold, Thresh4. This is illustrated between tracks 4 and 5 in FIG. 6, where the track squeeze Ds at servo sector n of tracks 4 and 5 is equal to the difference of the position errors P(4, n) and P(5, n). Moreover, there may be a track squeeze error between the current track K and the next track K+1 if P(K, n)>Thresh 5, where Thresh5 is a threshold of a prediction of the potential track squeeze error threshold between track K and track K+1. In the event of a track squeeze error by either of the foregoing techniques, between track K+1 and track K or between track K and track K+1. Track monitor 212 activates the reference trigger signal to notify servo writer 216 of the track squeeze error, thereby causing servo writer 216 to rewrite the servo pattern of the written track K. Again, this process repeats until no further track squeeze error exists or is predicted.

As shown in FIG. 2, angle θ exists between lines from the disc center, represented by the spindle axis 109, to clock head 204 and data head 114. Clock head 204 measures movement of disc 107 only in the Y1 direction, and data head 111 measured movement of disc 107 only in the Y2 direction. If disc 107 has a movement orthogonal to either of the Y1 and Y2 directions the corresponding head cannot sense the movement. Thus, if disc 107 has a movement solely in the X1 direction, clock head 204 measures no movement in the Y1 direction, but data head 111 senses a movement in the Y2 direction based on sinθ. Similarly, if disc 107 moves solely in the X2 direction, data head 111 senses no movement in the Y2 direction, while clock head 204 detects a movement in the Y1 direction based on sinθ. By reducing θ to a small angle, sinθ is similarly reduced and measurement error between the clock head and user head is minimized.

Stated another way, the present invention provides a process of detecting the magnitude and frequency of runout due to vibration of the cage of a spindle motor of a disc drive 100. The disc drive has a storage disc 107 and a data head 111 for writing data to the disc. The storage disc is rotatable about a spindle axis 109 by the spindle motor. A plurality of servo patterns consisting of gray codes and A, B, C and D servo bursts are written to a reference track 218 with data head 111 with an acceptable track closure error. The read portion of clock head 204 of servo writer 200 reads the plurality of servo patterns on reference track 218. The magnitude of position error of clock head 204 relative to reference track 218 is identified for each read servo pattern. The magnitude and frequency of the cage vibration (waveform 250 in FIG. 5) is identified based on the position errors for each servo pattern.

The invention also provides a process of writing servo patterns to a storage disc 107 of a disc drive 100. The disc drive has a data head 111 for writing data to the disc, and the storage disc is rotatable about a spindle axis 109 by a spindle motor having a cage. A servo writer 200 is positioned so that its clock head 202 may read data from disc 107. A plurality of servopatterns (FIG. 3) are written using data head 111 to a reference track 218. The process of writing to track 218 includes re-writing, if necessary, to achieve an acceptable track closure error. Data head 111 is positioned over user track 220 while clock head 204 is positioned over reference track 218. The position of clock head 204 to the reference track is identified based on the servo patterns on the reference track. The magnitude and frequency of runout due to vibration of the motor cage is learned from the position error of clock head 204 relative to reference track 218. Periods of low magnitude cage runout are calculated, based on a threshold Thresh2 in FIG. 5, and the servo patterns of FIG. 3 are written to user track 220 with data head 111 during the calculated periods.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the servo writer system while maintaining substantially the same functionality without departing from the scope and spirit of the present invention. Thus, although the preferred embodiment described herein is directed to a servo writer for a disc drive employing an embedded servo system, it will be appreciated by those skilled in the art that the teachings of the present invention can be applied to other systems, such as dedicated servo systems, without departing from the scope and spirit of the present invention. Moreover, while a specific example is set forth of a specific type of servo writer writing embedded servo patterns into servo sectors of a specific disc drive, the teachings of the present invention can be applied to other servo writers and other disc drives, employing other configurations of servo patterns and servo sectors, without departing from the scope and spirit of the present invention.

What is claimed is:

1. A process of detecting the magnitude and frequency of runout due to vibration of the cage of a spindle motor of a disc drive having a storage disc rotatable about a spindle axis by the spindle motor, the process comprising steps of:

a) writing a plurality of servo patterns to a reference track on the disc;

b) reading the plurality of servo patterns on the reference track with a clock head over a plurality of revolutions of the disc;

c) identifying a magnitude of position error of the clock head relative to the reference track for each of the read servo patterns; and d) identifying a magnitude and frequency of runout due to cage vibration based on the identified position errors.

2. The process of claim 1, wherein step (d) includes steps of:

d1) storing the values of position error magnitude over a plurality of revolutions of the disc, and d2) identifying a cage vibration frequency based on the position error magnitudes.

3. The process of claim 1, further including steps of:

e) identifying periods of low magnitude runout due to cage vibration, and f) writing servo patterns to a user track on the disc during periods of low magnitude runout.

4. The process of claim 3, wherein step (e) comprises steps of:

e1) identifying a magnitude of a splice in the reference track, e2) establishing a first threshold of acceptable position error, and e3) identifying periods when the magnitude of the splice is not greater than the first threshold.

5. The process of claim 4, wherein the magnitude of the splice is based on the magnitude of the position error of the clock head relative to the servo patterns on each side of the splice along the reference track.

6. The process of claim 4, wherein step (f) includes steps of:
   f1) setting a servo write enable signal during the periods identified in step (e3), and
   f2) enabling the writing of servo patterns with the write enable signal.

7. The process of claim 3, wherein step (d) includes steps of:
   d1) storing the values of position error magnitude over a plurality of revolutions of the disc, and
   d2) identifying a cage vibration frequency based on the position error magnitudes.

8. The process of claim 3, further including steps of:
   g) identifying a track closure error of the user track, and
   h) if the track closure error exceeds a predetermined second threshold, repeating step (f) until the track closure error does not exceed the second threshold.

9. The process of claim 8, wherein step (g) is performed by steps of:
   g1) saving a representation of position error for each servo pattern on the user track based on the identified position error of the clock head,
   g2) calculating a position error splice based on a difference of position error at servo patterns 0 and N–1, where N is the number of servo patterns on the user track, and
   g3) identifying a relation of the position error splice to the second threshold.

10. The process of claim 3, further including steps of:
    g) identifying a track spacing between the user track and an adjacent track, and
    h) if the track spacing is less than a predetermined threshold, repeating step (f) until the track spacing is not less than the threshold.

11. The process of claim 10, wherein step (g) is performed by steps of:
    g1) saving a representation of position error for each servo pattern on a first user track based on the identified position error of the clock head,
    g2) saving a representation of position error for each servo pattern on a second user track based on the identified position error of the clock head, where the second user track is adjacent the first user track,
    g3) calculating a track spacing between the first and second user tracks based on a difference of position error at a first servo pattern on the first user track and a at second servo pattern on the second user track, where the first and second servo patterns are adjacent, and
    g4) identifying a relation between the track spacing and the third[0ax4]hreshold.

12. The process of claim 11, wherein step (g) further includes steps of:
    g5) predicting a position error for each servo pattern on a third user track based on the identified position error of the clock head, where the third user track is adjacent the second user track,
    g6) calculating a predicted track spacing between the second and third user tracks based on a difference of position error at the second servo pattern on the second user track and a predicted position error at a third servo pattern on the third user track, where the second and third servo patterns are adjacent, and
    g7) identifying a relation between the predicted track spacing and a second threshold.

13. The process of claim 3, further including steps of:
    g) before step (a), writing a clock pattern to the reference track, and
    h) simultaneously with step (f), reading the clock pattern from the reference track with the clock head.

14. A process of writing servo patterns to a storage disc of a disc drive having a data head, the storage disc being rotatable about a spindle axis by a spindle motor having a cage, the process comprising steps of:
    a) positioning a servo writer having a clock head so that the clock head is adjacent the disc;
    b) writing a plurality of servo patterns to a reference track on the disc with the data head;
    c) reading the plurality of servo patterns on the reference track with the clock head over a plurality of revolutions of the disc;
    d) identifying a magnitude of position error of the clock head relative to the reference track for each of the read servo patterns; and
    e) identifying a magnitude and frequency of runout due to cage vibration based on the identified position errors;
    f) identifying periods of low magnitude runout due to cage vibration; and
    g) writing servo patterns to a user track on the disc with the data head during periods of low magnitude runout.

15. The process of claim 14, wherein step (f) comprises steps of:
    f1) identifying a magnitude of a splice in the reference track,
    f2) establishing a first threshold of acceptable position error, and
    f3) identifying periods when the magnitude of the splice is not greater than the first threshold.

16. The process of claim 15, wherein step (g) includes steps of:
    g1) setting a servo write enable signal during the periods identified in step f3, and
    g2) enabling the writing of servo patterns with the write enable signal.

17. The process of claim 14 wherein step (e) includes steps of:
    e1) storing the values of position error magnitude over a plurality of revolutions of the disc, and
    e2) identifying a cage vibration frequency based on the position error magnitudes.

18. The process of claim 14, further including steps of:
    h) identifying a track closure error of the user track, and
    i) if the track closure error exceeds a predetermined second threshold, repeating step (g) until the track closure error does not exceed the second threshold.

19. The process of claim 14, further including steps of:
    h) identifying a track spacing between the user track and an adjacent track, and
    i) if the track spacing is less than a predetermined threshold, repeating step (f) until the track spacing is not less than the threshold.

20. The process of claim 14, further including steps of:
    h) before step (b), writing a clock pattern to the reference track with the clock head, and
    i) simultaneously with step (f), reading the clock pattern from the reference track with the clock head.

* * * * *

UNITED STATES PATENT AND TRADEMARK OFFICE
CERTIFICATE OF CORRECTION

PATENT NO.    : 6,628,471 B1
DATED         : September 30, 2003
INVENTOR(S)   : ShuangQuan Min et al.

It is certified that error appears in the above-identified patent and that said Letters Patent is hereby corrected as shown below:

Column 9,
Line 57, after "the" delete "third [0ax4]".
Line 57, change "hreshold" to -- threshold --.

Signed and Sealed this

Twenty-third Day of March, 2004

JON W. DUDAS
*Acting Director of the United States Patent and Trademark Office*